US008780195B1

(12) United States Patent
Rubin

(10) Patent No.: US 8,780,195 B1
(45) Date of Patent: Jul. 15, 2014

(54) FUSION OF MULTI-SENSOR INFORMATION WITH OPERATOR-LEARNED BEHAVIOR FOR AUTOMATIC AND EFFICIENT RECOGNITION OF OBJECTS AND CONTROL OF REMOTE VEHICLES

(75) Inventor: Stuart H. Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 485 days.

(21) Appl. No.: 13/222,413

(22) Filed: Aug. 31, 2011

(51) Int. Cl.
*H04N 7/00* (2011.01)
*H04N 7/18* (2006.01)
*G05B 19/42* (2006.01)
*G10L 15/00* (2013.01)
*G10L 15/04* (2013.01)
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl.
USPC ............... 348/114; 700/86; 704/251; 706/15

(58) Field of Classification Search
CPC ............. G05D 2201/0207; G05D 2201/0209; G06F 17/30256; G06F 17/30265; G06F 17/30247; Y10S 707/99933; Y10S 707/99935; Y10S 707/99936; G06K 9/6247; G06K 9/00221; G06K 9/00154; G06K 9/00624
USPC ................................ 348/114; 706/15, 86, 251
See application file for complete search history.

(56) References Cited

U.S. PATENT DOCUMENTS

| 7,047,226 B2 | 5/2006 | Rubin |
| 7,840,518 B1 | 11/2010 | Rubin |
| 2006/0200258 A1* | 9/2006 | Hoffberg et al. ............... 700/86 |
| 2008/0162389 A1* | 7/2008 | Aboutalib ........................ 706/15 |
| 2009/0083034 A1* | 3/2009 | Hernandez et al. ........... 704/251 |

OTHER PUBLICATIONS

Chaitin, Gregory J., "Randomness and Mathematical Proof", Scientific American, 1975, pp. 47-52, vol. 232, No. 5.
Rubin, S. H., Murthy, S. N. J., Smith, M. H., Trajkovic, L. Kaser; Knowledge Amplification by Structured Expert Randomization; Journal; Dec. 2004; pp. 2317-2329; vol. 34; IEEE Transactions on Systems, Man, and Cybernetics.
Rubin, S.H., "On randomization and discovery", Information Sciences, 2007, pp. 170-191, vol. 177, issue 1.
Rubin, Stuart H., "Computing with Words", IEEE Transactions on Systems, Man, and Cybernetics—Part B: Cybernetics, 1999, pp. 518-524, vol. 29, No. 4.

(Continued)

*Primary Examiner* — Joseph Ustaris
*Assistant Examiner* — Farhan Mahmud
(74) *Attorney, Agent, or Firm* — SPAWAR Systems Center Pacific; J. Eric Anderson; Kyle Eppele

(57) ABSTRACT

Systems and methods are described for remotely controlled vehicles that hierarchically transform sensor-detected information into levels of increasing fidelity for highly efficient machine recognition of attributes and features of detected objects/events. Fusion of the feature space representations of the various levels allows correlation with the operator's attention to the respective objects for automated processing/controlling of the unmanned vehicle. High efficiencies in object/event recognition are attained with reduced memory and processor requirements, enabling near autonomous or fully autonomous operation of the vehicle.

1 Claim, 6 Drawing Sheets

(56) References Cited

OTHER PUBLICATIONS

Lin, Jyh-Han et al., "Complexity Results on Learning by Neural Nets", Machine Learning, 1991, pp. 211-230, vol. 6, No. 3.

Zadeh, Lotfi A., "From Computing with Numbers to Computing with Words—From Manipulation of Measurements to Manipulation of Perceptions", IEEE Transactions on Circuits and Systems—I: Fundamental Theory and Applications, 1999, pp. 105-119, vol. 45, No. 1.

\* cited by examiner

FUSION OF MULTI-SENSOR INFORMATION WITH OPERATOR-LEARNED BEHAVIOR FOR AUTOMATIC AND EFFICIENT RECOGNITION OF OBJECTS AND CONTROL OF REMOTE VEHICLES

FEDERALLY-SPONSORED RESEARCH AND DEVELOPMENT

This invention is assigned to the United States Government. Licensing inquiries may be directed to Office of Research and Technical Applications, Space and Naval Warfare Systems Center, Pacific, Code 72120, San Diego, Calif., 92152; telephone 619-553-2778; email: T2@spawar.navy.mil. Reference Navy Case No. 100666.

BACKGROUND

This disclosure relates generally to the field of information fusion for machined based object/event recognition. More particularly, this disclosure relates to fusion of multi-modal sensor information with operator-learned behavior for object/event recognition and autonomous control of remote vehicles.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a computerized method for machine recognition of objects or events from a remotely controlled, unmanned vehicle is provided, comprising, electronically receiving at least a first and second signal from sensors deployed on the vehicle; determining signal-specific components for partitioning each signal; building sets of independent levels for each signal representing hierarchal information from the signals, each set containing levels spanning from a lowest information level($i=0$), where i is an integer, to a highest information level($i=n$), where n is a maximum integer; evaluating each level(i) within its set with its associated signal-specific components; building sets of vector signatures associating each level(i) with its evaluated associated signal-specific components; correcting, via a remote human operator of the vehicle, an accuracy of the vector signatures; combining the sets of vector signatures from each signal to form fused signature vectors; mapping natural language semantics to match the fused signature vectors, beginning at lower levels and increasing until a match is found; assigning unique matched semantics to each level(i); pairing syntaxes with the unique semantics and saving the associated fused signature vectors; and eliminating fused signature vectors that result in non-deterministic matches, wherein resulting sets of fused signature vectors and their syntaxed unique semantics define a transformation of information from the signals into machine generated descriptions of objects or events.

In another aspect of the disclosed embodiments, a computerized system for machine recognition of objects or events from a remotely controlled, unmanned vehicle is provided, comprising means for electronically receiving at least a first and second signal from sensors deployed on the vehicle; means for determining signal-specific components for partitioning each signal; means for building sets of independent levels for each signal representing hierarchal information from the signals, each set containing levels spanning from a lowest information level($i=0$), where i is an integer, to a highest information level($i=n$), where n is a maximum integer; means for evaluating each level(i) within its set with its associated signal-specific components; means for building sets of vector signatures associating each level(i) with its evaluated associated signal-specific components; means for correcting, via a remote human operator of the vehicle, an accuracy of the vector signatures; means for combining the sets of vector signatures from each signal to form fused signature vectors; means for mapping natural language semantics to match the fused signature vectors, beginning at lower levels and increasing until a match is found; means for assigning unique matched semantics to each level(i); means for pairing syntaxes with the unique semantics and saving the associated fused signature vectors; and means for eliminating fused signature vectors that are result in non-deterministic matches, wherein resulting sets of fused signature vectors and their unique semantics define a transformation of information from the signals into machine generated descriptions of objects or events.

DETAILED DESCRIPTION

Figure 1A:
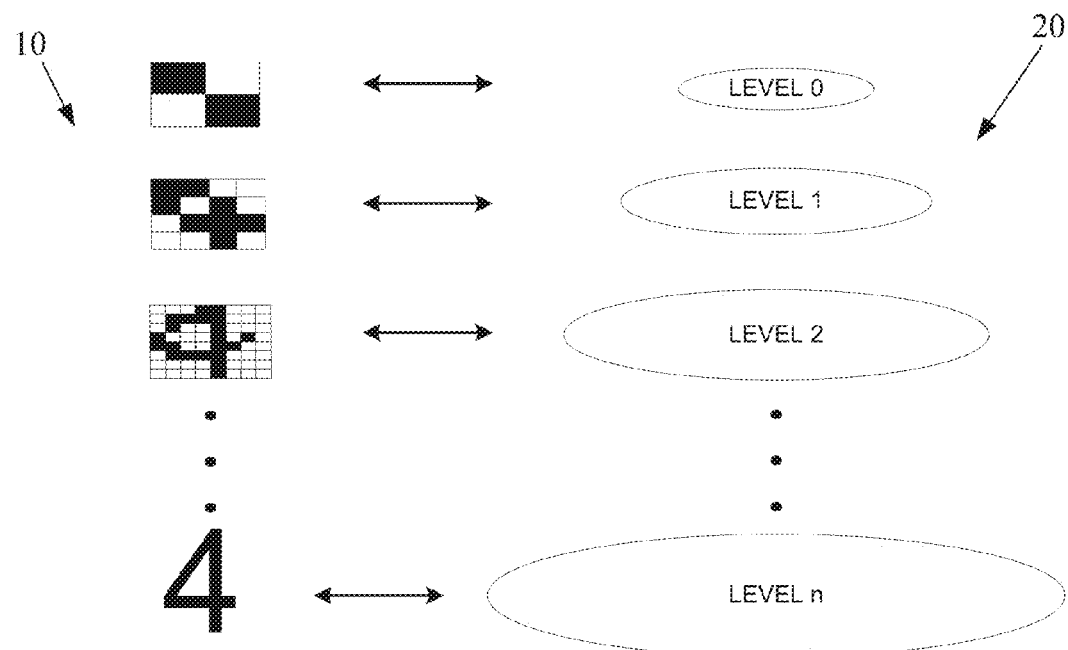
FIGS. 1A-C are illustrations of discrimination examples.

Machine learning in the context of object recognition for remotely controlled vehicles generally requires an object-oriented database containing records, and pairing images and vehicle instructions (e.g., zoom in, veer left, descend, and so forth) to coordinate matching of the vehicle's "view" with the database images. However, the difficulty with this approach is that: (a) this method is quite storage intensive, and (b) if an image does not exactly match a stored one, it cannot be processed.

These difficulties frame the central problems in machine vision, specifically the challenges can be summarized as: (1) how to generalize the image base; (2) how not to over-generalize this base; (3) how to acquire and time stamp images; (4) how to evolve figures of merit to evaluate the likelihood of a match; and (5) how to evolve heuristics, which serve to speedup the matching process, among related lesser details.

In view of the above, one exemplary approach described herein is the implementation of a capability to "machine learn" from the remote operator what differentiates an interesting scene from a mundane scene, and acting upon this learned information. This approach is especially germane for unmanned aerial vehicles (UAVs), such as photo-reconnaissance UAVs. For example, when objects are paired with some desired operator action, the operator action can be automatically replayed in case of a match. One such scenario is where the UAV is automatically instructed to reduce its altitude for a closer look in a process that is akin to context-directed translation.

Another exemplary approach is to the marry the above operator-learned scheme to autonomous fusing of various sensor signals, such as in hyperspectral imagery. The exemplary fusing methodology converges to object identification using a scalable hierarchical approach and is very processor and memory efficient, providing an increase of object recognition capabilities that is several orders of magnitude better than in conventional matching approaches. The combination of operator-observed learning and multi-sensor fusing yields a more accurate object recognition capability than is otherwise possible. The introduction to the theory underpinning these approaches is presented below.

Introduction

Version spaces have shown that the number of possible generalizations, known as the generalization space, grows exponentially in the number of predicate features. A version space saves all most-general and most-specific productions and converges as the most general become specialized and the most specific becomes generalized. The idea is that the version space will collapse to context-sensitive production(s)—representing the true correction—when the true production(s) has been learned. In view of this, the implied need is for knowledge-based translation, where the knowledge takes the form of heuristics because version spaces can rapidly become intractable without them. This can be conceptually described as "what feature makes an image interesting—is it the mix of colors, and/or its smokestack, and/or its silhouette, etc?"

However, the number of possibilities is exponential as to the number of features. This difficulty can be addressed by developing an exemplary system which, in one aspect, ties in with the vehicle control system and learns to extract reason for its human-supplied direction—much as a co-operator (or co-pilot) would without being explicitly told because there is no practical way to accomplish that. In this manner, the exemplary system evolves a true understanding of what feature is interesting in an image (or sequence thereof). For all engineering intents and purposes, the exemplary system will mimic the instincts of its trainer(s). Not only does such a system serve unmanned vehicle control needs, but from a purely scientific perspective, it can be said to conceptualize causality, or equivalently converge on image semantics. Accomplishing this critical missing step enables unmanned vehicles, for example UAVs, and non-aerial vehicles, unmanned underwater vehicles (UUVs), and so forth, to become truly autonomous.

It should be noted that while the general description of the exemplary methods and systems in this disclosure are stated in the context of UAVs (aerial vehicles), it is explicitly understood that the principles, methods, and systems described herein may be applied to other types of vehicles (including part-time human operated vehicles), encompassing aerial, underwater, non-terrestrial, interplanetary, and other such vehicles. Accordingly, it is expressly understood that non-UAV platforms may be implemented without departing from the spirit and scope of this disclosure.

For purposes of efficiency, when using an image, as few pixels as possible should be used for identification—including, most importantly, reference to the proper segment for the next level of identification. This principle serves to minimize processing demands. However, image sensors will not be practical if they only focus at the level of the individual pixel, which may be great for photography, but would be unacceptable for automated image recognition. Rather, an image is understood to be defined by the "features" that it embodies which describe the underlying object.

In this light, the concept of features can be static as well as dynamic. For example, a static feature could be the outline of a ship against the horizon; whereas, a dynamic feature could be the same ship whose bridge differs more or less in position from that of the last captured image.

Regarding features, consider a Tic-Tac-Toe board, where each of nine cells may assume one of three possible values, namely the set of (blank, X, or O). This allows for the formation of $3^9$ or 19,683 features (boards). Of course, playing this game using features would be enormously wasteful of space and utterly impossible for more complex games like chess, where algorithms are more appropriate as randomizations.

Consider next a context-free grammatical (CFG) representation, which it will be noted, captures the inherent hierarchy in the game of Tic-Tac-Toe. Here is a partially completed grammar for the game: Loss→O O O; Win→X X X; Draw→A Y|Y B; where Y→X|O; A→X-|O-; and B→-X|-O.

Notice that the Draw feature is recursively decomposed into its four constituent patterns; namely, X-X, X-O, O-X, and O-O. The extraction of sub-patterns facilitates the recognition process in the large. For example, instead of learning -X-, we may learn -B, where B is a previously acquired sub-pattern. Such "randomization" allows for the definition of features. In this example, B is a feature, where features may be recursively defined, which is in keeping with the concept of a hierarchical architecture.

Using another example, in a black and white (B&W) image of only 262,144 pixels, the feature space is $2^{262,144}$, which is clearly intractable. A perfect hierarchical approach would have $\log_2 2^{262,144} = 262,144$ features which, while enormously better, does not go far enough in distinguishing good from bad features. Said differently, not all 262,144 features should be evaluated, as only those that are "important" should be evaluated. An eyelash does not "add" to the determination that an image is a person's face and as such would not be important to the characterization as a person. Accordingly, the search for features should be directed by acquired heuristics.

The above examples typify the classic "generalization problem" encountered this field. The traditional solution requires a generalization language (e.g., A, B, Y, . . . ) and an iterative search process for randomization (it is understood that randomization is a term of art in this field). Moreover, it is well-known from the various pumping lemmas that many problems cannot be represented in a context-free language (e.g., languages of the form, $a''b''c''$).

The most general representation language is the Type 0 (i.e., phrase structure or contracting) grammar, which is best exemplified by natural language. Thus, it is suggested that images should hierarchically be converted to English, using a contracting grammar, for the most general pattern recognition to be attainable. The problem with this approach is that English is not interpretable in the same way that a context-free computer language is. While possible in theory, it too is impractical for this reason. Thus, while two-level, or w-grammars can attain the complexity of natural language, they lack a mechanics to ascribe a proper semantics to transformational images of productions.

It is submitted here that one appropriate solution is to store all or nearly all images in randomized form, where subsequent to expansion a greater randomization is attempted, which is concomitant with knowledge acquired in the interim. Randomization should be understood to not necessarily imply lossless compression. For flexibility, there should be an allowance for imprecision—not only in sensor measurement, but in conceptual definition. The degree of this allowance is acquired as context-sensitive transformation rules by the learning algorithm. In any case, a basis is acquired and when generalization of that basis allows inclusions, which should not be admitted, another basis function should be acquired to exclude them. Clearly, under this approach, the larger the base of like entities, the greater will be the degree of possible randomizations and vice versa.

For the purposes of this disclosure, the term "event-driven randomization" is defined for the aforementioned hierarchical approach. For example, one starts with a pixel image in full detail and iteratively averages neighboring pixels over a progressively coarser mesh until such generalization would allow an improper categorical inclusion. An analogy to this process is making cartoons of objects or people. We still can recognize whether the cartoon character is a female or a male, even though the representation is very "coarse."

Improperly mapped concepts will be acquired at a higher level of resolution. Then, in order to prevent an unknown object from improperly mapping onto an object, which is too general, it will be compared with the objects stored at the next more-specific level, if possible. If no objects have been stored at that level, or if the current level is at the level of the individual pixel, then the current level of generalization is used for conceptual definition. However, if a more-specific level exists and is populated with a match having a higher figure of merit, then the more-specific match is taken.

It is submitted here that feature space is not mathematically defined by the intractable number of possible feature combinations. Rather, it is defined by the tractable number of experienced categories of generalization. What makes the exemplary methodologies described herein desirable is that it makes use of structural generalizations, where the attached semantics evolve from the replication of similar structures whose apparent complexity is offset by randomization.

Theory

The multisensory hyperspectral recognition and fusion of "images" is broadly defined by the inventor's Theory of Randomization (S. H. Rubin, "On Randomization and Discovery, "*Information Sciences*, (INS-D-05-1154), vol. 177, issue 1, January 2007, pp. 170-191), which is incorporated herein by reference in its entirety. In this present implementation, the Theory of Randomization is developed for minimal storage, retrieval, and learning time, and maximal accuracy. It is expressly understood that while the term "image" is used, other applicable forms of representation can be used. For example, sound, temperature, radiation, etc. may be used instead of image, where applicable.

Definition 1. The fundamental unit of 'mass' storage, but by no means the only one, is the image or slide. Then, the representation for a dynamic set of such images is to be randomized.

Definition 2. An image is said to be at level n if it contains $2^n \times 2^n$ pixels.

Definition 3. An image may be strictly converted from level n to level n−1 as follows.

$$\bigcup_{i=0}^{2^{n-1}-1} \bigcup_{j=0}^{2^{n-1}-1} a_{i,j} = \begin{pmatrix} 1, & \delta_{i,j} > \text{threshold} \\ 0, & \text{otherwise;} \end{pmatrix} \quad \text{Eq. 1}$$

where, $$\delta_{i,j} = \frac{a_{2i+1,2j+1} + a_{2i+2,2j+1} + a_{2i+1,2j+2} + a_{2i+2,2j+2}}{4},$$

Where "a" is a subscripted pixel. Threshold is a constant that determines if a pixel will be black or white (colored or not).

Definition 4. A color image may be captured using three filters—in this example, the color filters can be red, green, and blue (RGB). Hence, a color image is defined by $\cup\{A_r, A_g, A_b\}$, where A is the set of pixels for the subscripted color. Similarly, an auditory image may be captured using three filters—in this example, low pass (L), medium pass (M), and high pass (H). Hence, an auditory image is defined by $\cup\{A_L, A_M, A_H\}$.

Definition 5. A color image at level n is defined by $2^n$ non-symmetric ray traces. A ray trace counts the number of changes in pixel brightness—either moving from a dark to a light pixel or vice versa adds one to the ray trace count. The union of these counts, in any fixed order, comprises a vector signature, which defines the image at that level. Then, a color vector signature is comprised of a vector of ordered triples, representing the RGB scans for the same ray. It is noted that depending on the scan basis functions, the ordered sets may lower or higher (e.g., RGB=triplet). A similar approach can be applied to an auditory image using appropriately ordered sets.

Theorem 1 (The tracking theorem). An object(s) at the center of attention may be tracked under the assumption of continuous movement using ray tracing.

Proof

Assume high enough speed vector matching for the evaluation of an outer ring of concentric images, which may overlap and contain the maximum degree of such overlap as is practical. Then, it follows that the ring containing the closest vector signature using the 2-norm will designate the track. If this were not the case then either the image is not unique or the system is not sufficiently trained.

Theorem 2 (The hyperspectral fusion theorem). Any vector, or vector of vectors, may be integrated into a systemic vector signature. This provides for multisensory fusion.

Proof

It suffices to show that any number of vectors of vectors can be fused into a single integer because this integer may be mapped to countably infinite semantics. Then, it needs to be shown that every semantics (integer) has an inverse mapping, which may be a "do nothing" mapping. That a vector of vectors may be mapped to a single integer follows from the definition of pairing functions. Then, projection functions exist, which can reverse map a paired function back to its constituent elements, where integers that are not mapped by pairing functions are reverse mapped to "do nothing."

Example 2.1

Let k be the temporal sampling differential, which may be thought of as the appropriate interval for whatever is being observed—from a snail to a bullet, etc. Let the vector signature at time t be given by $V_t$ and the next vector signature be given by $V_{t+k}$. Then, velocity is defined by $V_{t+k}-V_t$ and acceleration is defined by $(V_{t+2k}-V_{t+k})-(V_{t+k}-V_t)=V_{t+2k}-2V_{t+k}+V_t$, which is used in the numerical solution of partial differential equations. For example, let $V_t=(1, 2, 4, 6, 5, 4, 4, 5)$; $V_{t+k}=(1, 2, 5, 8, 6, 4, 4, 5)$; and $V_{t+2k}=(1, 3, 7, 11, 8, 5, 4, 5)$. Then, $V_{t+k}-V_t=(0, 0, 1, 2, 1, 0, 0, 0)$ and $V_{t+2k}-2V_{t+k}+V_t=(0, 1, 1, 1, 1, 0, 0)$. Vector elements may be negative because differences, rather than pixel crossings, are being measured. Here, the non-zero elements reflect velocity and acceleration, respectively. These two vectors may be fused to allow for motion recognition. This result has been presented for B&W, but may be adapted, using a vector of vectors, to accommodate color and/or sound, etc.

Comment 2.1: It follows from the hyperspectral fusion theorem that each vector signature should independently map to a semantic(s) and the collection of these (or collection of collections) should map to a fused semantics. This is how pairing functions work. The output semantics are then the fused semantics and may be identical to or distinct from the pre-fused semantics at each lower stage. A union vector signature is said to be matched if and only if each member of said union is matched.

Comment 2.2: Visual vector signatures may be permuted (i.e., iteratively move the first element to the position of the last element) to account for rotation of the image without the need to reclassify it (and cost more storage space). This is referred to as normalization. Other sensory modalities may also be normalized, where the mechanics of so doing should remain domain specific. For example, acoustic sensors may be normalized for relative motion, ambient noise, altitude, etc. Preprocessing functions (e.g., edge detectors, texture analysis, etc.) also fall into this domain-specific category. Automated machine learning can be applied, if needed, as some connections are just too dynamic to be efficiently hard-wired.

Theorem 3 (The randomization theorem). The following stipulations define a unified multi-level storage methodology. The proofs are by induction.

a. Every signature vector is to be paired with a semantics, M:1, which is defined in natural language, where M represents the set of distinct signature vectors may be paired with the same semantics. Two or more signature vectors may be recursively fused to yield one semantics, M:1. The requirement for a unique semantics only holds for a given level. That is, distinct levels may hold distinct semantics; albeit, only one. This may be expressed as M:1/i, where i is the level number. Every syntax may be paired with exactly one semantics, M:1/i. However, in practice distinct levels may be expected to hold the same semantics as defined by the same syntax. One practical way to randomize the storage, decrease recognition time, and increase storage capacity, but at the cost of less verbal discriminatory power, is to employ object-oriented class semantics and either single or multiple inheritance. The former is most economical, while the latter allows for the development of greater verbal discriminatory power.

b. Two signature vectors, on the same level, are said to be equivalent if they are equal or they share a common permutation—the definition of which is necessarily domain specific. Two unions of signature vectors, on the same level, are said to be equivalent if they are equal or they can be put in bijective correspondence (i.e., 1:1 and onto), where each such constituent pairing is equivalent.

c. Two signature vectors or unions of signature vectors, if equivalent, should point to the same semantics, in which case they are redundant. Otherwise, non-determinism is created, which is not permitted.

If a signature vector or unions of signature vectors has no equivalent at a certain level, then it may be saved at the most-general level where this occurs—regardless of the semantics it is paired with. Conversely, if any member of the union fails to be matched at level i, the next more-specific level is computed, if any.

d. In case of non-determinism, more detail is sought to resolve it. Thus, if a more-specific level exists, the non-deterministic pair of signature vectors or unions of signature vectors are removed from the present level and recomputed using the resolution available at the next more-specific level until acquired or not acquired after having reached the most-specific level. If the original pair is deterministic at some more-specific level, but induces a non-determinism with one or two signature vectors or unions of signature vectors (two is the maximum number), then the deterministic pairing is saved (optionally expunging the least-recently used (LRU) member at level n as needed to free space, where level n is the most-specific and thus the LRU level, which holds the greatest amount of storage), the non-deterministic pairing(s) is removed, stacked, and recursively processed.

Any deterministic pairs may be saved at the level they were found at. If either member of a non-deterministic pairing is not available for more resolute computing, then it is optionally expunged and forgotten. If the non-deterministic pair of signature vectors or unions of signature vectors is not acquired after having reached the most-specific level or if deterministic and there is insufficient space for the storage of both, then the most recently acquired member of the pairing is saved (i.e., temporal locality) and the LRU member at that level is expunged as needed to free space. Furthermore, such movement is self-limiting because there are going to be far fewer incidents of non determinism at the more-specific levels. This is because the combinatorics of ray tracing (or equivalent) grow exponentially; whereas, the number of pixels on successive levels only grows quadratically. Also, it is not appropriate to allow for inexact matching at any level, since that is already accounted for by the representational formalism at the next more-general level.

e. If space becomes a premium, the LRU most-specific unions of signature vectors or signature vectors can be expunged in that order. This minimizes the functional number of lost memories, while maximizing the reclaimed space. In effect, the exemplary system may not learn complex new patterns, but does not forget simple old ones either.

In view of the above-described approach, the exemplary process/algorithm(s) described herein is coded as software that is executed by a processor having memory, corresponding with a database containing match candidates. The executed instructions for the exemplary algorithm transforms image information arriving in the form of pixels (or auditory information representation, or other domain representations) into attributes and features that can be machine recognized. As such, the features are correlated with the operator's attention to the respective features and machine learning approach for automated processing/controlling of the unmanned vehicle can be attained, thus enabling near autonomous or fully autonomous operation of the vehicle.

It is understood that acquired images/sound, etc. usually contain a number of pixels/frequencies, etc. that are saturated or corrupted. These may occur as isolated single or as clusters scattered over the raw information, reducing the fidelity of the areas of interest. Therefore, preprocessing (or post-processing) can be utilized to remove aberrations or noise or any other artifact may be implemented, according to design preference. Processing and filtering paradigms are well known in the art and are accordingly not detailed herein. Examples illustrating the above concepts and implementations thereof are presented below.

Figure 1B:
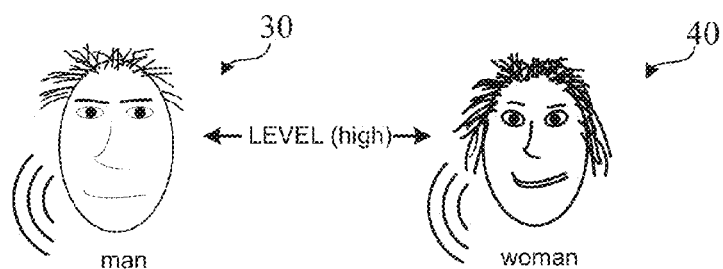
Figure 1C:
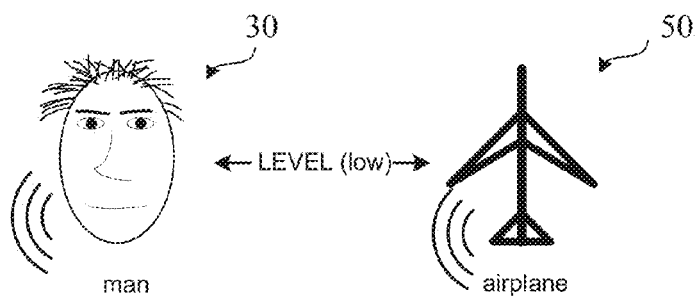

FIGS. 1A-C are illustrations of simple image discrimination examples in the context of different "levels." FIG. 1A illustrates various images on the left 10 that are pixelized black & white representations of an image with increasing resolutions. On the right are level designations 20 for each of the corresponding pixelized images. As the resolution of the underlying image (representing the number 4) is increased, it is evident that at some appropriate level, the ability to recognize the image as the number 4 can be reasonably arrived at without having to approach the highest-most level n. For example, at level 2, it can be seen that the general form of the number 4 is evolving. Some threshold, knowledge-base, expert system, operator feedback, or fusion-based measure, etc. may be applied to decide if level 2 contains sufficient enough feature evidence to conclude that the image is the number 4, or if not, then if the next level, level 3 (not shown), provides the sufficiency that is needed. It is noted that the concept of "features," though not very obvious to this specific example, may be applied to the increasing levels and the concomitant associated semantics.

FIG. 1B is another example of level association using human faces as the object under observation. A man's image 30 is shown with general shapes (or "features") that are similar to those of the woman's image 40. Because of the similarities, to differentiate the object (man 30) from a woman or not, a high level of feature recognition is necessary, if relying solely on information from the image. To aid in recognition (or differentiation, depending on your objective), reference to another modality (or sensor domain) such as auditory matching can be fused to determine if detected sounds from the object (man 30) is a woman. Keying on the frequency differences between men's speech and women's speech, it will be possible to reduce the number of "fused" levels for recognition from that of a non-fused level of image information only. Reduced levels directly comports to reduced data storage requirements for object recognition.

FIG. 1C is another example of level association using a human face 30 versus an airplane 50. In this example, the man's face 30 is very dissimilar to the image of the airplane 50. Therefore, a very low level of information is necessary to determine that the left image (man's face 30) is different from the airplane 50. Further efficiencies can be obtained by using an auditory comparison. That is, the sound from the man 30 will be very different from the sound from the airplane. The "fusion" of these different modalities results in only requiring very low levels of feature related information for accurate object discrimination. It is interesting to note that while this example emphasizes object differentiation (e.g., non-match), matching can also be accomplished. For example, the sound of the airplane could be so distinctive that its acoustic feature level is very low, thus overriding the associated image level. Therefore, based on the feature traits of different objects and the type of feature being observed, the level of information required for identification/differentiation can be efficiently arrived at (or recognition of a specific feature can be "tailored") to identify that object.

Initially, the exemplary methodology defines level n of an image to be the full resolution, which without loss of generality may be assumed to be a power of 2 and square in the layout of its pixels (e.g., $1 \times 1$, $2 \times 2$, $4 \times 4$, $8 \times 8$, ..., $2n \times 2n$). Hence, level 0 consists of one pixel, level 1, 4 pixels, level 2, 16 pixels, ..., and level n, $2^{2n}$ pixels. At this rate, a megapixel image is encoded at level 10. It is simple to convert an image from level n to level n−1. Simply convert every $2 \times 2$ contiguous grouping to a $1 \times 1$ (i.e., a single pixel). Notice that there is no overlap among $2 \times 2$ groups. The shading of the four contiguous pixels can be averaged to find that for their reduction (e.g., black or white depending on threshold). The same procedure can be extended to the use of pixels as measured through RGB color filters.

Using ray tracing, the number of rays in the tracing should bear proportion to the number of pixels in the image. In practice, this number should be more constrained due to tractability and constraints on time and space. The number of rays is defined by the square root of the number of pixels, which follows from the definition of level. This methodology compresses an image into effectively less than the square root of the number of pixels in weights (i.e., given the advantages provided by multiple levels), which can not only outperform neural networks in required storage space for the weights (i.e., the number of fundamental memories that can be saved), but does not incur the need for iterative retraining. Thus, while neural networks having a hidden layer that are NP-hard in their training time, the present exemplary method operates in polynomial time. That difference in time is profound. This approach is also understood to be amenable to fine-grained parallel realization.

As an example, consider an image of a fork. At least two images will need to be captured for its recognition—one top-down and one sideways. If the image is far from centered, then it will need to be recaptured as part of the image may have been truncated. In addition, the image may not be angularly aligned. Also, the fork may contain a bit of tarnish, but this is not sufficient to cause it not to be a fork. It can be seen that rotational and positional invariance can be utilized to minimize the number of instances of a particular image (i.e., fundamental memories) that need be stored.

Figure 2:
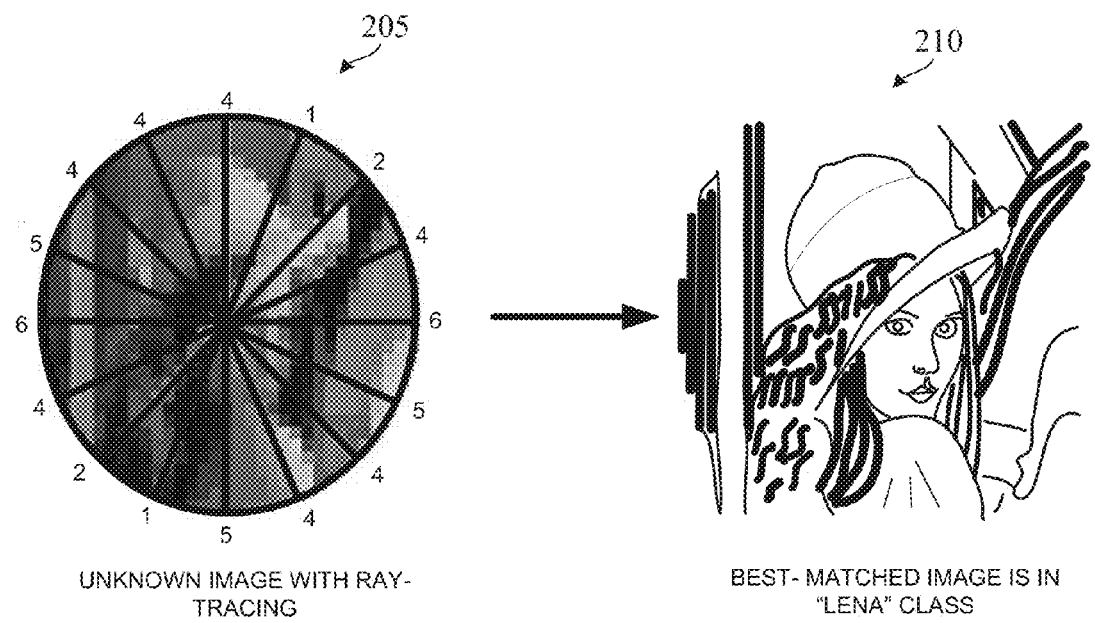
FIG. 2 is an illustration showing an exemplary ray tracing approach.

An example of the above ray-tracing methodology is presented in FIG. 2, with a low resolution generalized image 205 of an object to be identified compared to a photograph (shown as line illustration 210) of the actual image (Lena) representing the object. The low resolution image 205 operates as a proxy to a specific low level representation. In reality, the line illustration 210 would be an actual photograph or "best" match representation, however, for the purposes of this description a line illustration 210 was used as a proxy. The generalized image of Lena has the following vector signatures (1, 2, 4, 6, 5, 4, 4, 5) as seen around the periphery of the image 205. These integers represent the number of threshold changes incurred by the ray as it traverses the diameter of the image having a central focus. Again, color images can be so processed as the fusion of the same using distinct red, green, and blue filters. The vector signature would become that of ordered triples instead of singletons (e.g., (<1, 1, 3>, <1, 2, 3>, <1, 4, 7>, <6, 4, 2>, <3, 5, 4>, <5, 4, 3>, <4, 4, 4>, <5, 5, 0>). The processing of hyperspectral images is similar. Ray tracing has an advantage in that it is somewhat insensitive to the requirement for exact image centering.

In a training scenario, it can be assumed that the operator will center the image. In recognition, we can assume that multiple images are snapped using a circular pattern around the presumed center. Then, all images, save the one having the best recognition score, will be freed. The most-specific image having the highest figure of merit becomes the focus of attention. This response is dynamic with machine learning (as well as view). This then is perhaps the most practical method for image centering in the field (including zoom-in).

Operationally, if the circular pattern can be followed in real time, then once a center of attention is achieved, it may be followed and even reacquired (e.g., visually following a car, which passes under an overpass and thus is obscured for a second or two) by maintaining the best-matched vector signature(s) (i.e., as the exact one will likely change over time) in a cache as the frame of reference.

If photographic images can be used as a source, then it follows that the next question would be how to produce a vector signature using acoustic, radar, (inverse) synthetic aperture radar ((I)SAR), sonar, and/or more sophisticated sensors. Such vectors may be fused by taking their union. It is understood that 3D imaging is not recommended for inclusion because the registration of camera separation precludes the use of the more general levels, which would find no difference in vector signatures.

Consider the formation of an acoustic vector signature. As before, each successively more-specific level has double the number of vectorized elements. These elements uniformly sweep the desired frequency bands at time t (e.g., (500 Hz, 1000 Hz, 1,500 Hz, 2,000 Hz)). However, what is being sensed are interval frequencies (e.g., ([250 Hz-749 Hz], [750 Hz-1,249 Hz], [1,250 Hz-1,749 Hz], [1,750 Hz-2,249 Hz]))—with a noted allowance for "fuzzy" intervals as well.

Then, the vector signature records relative amplitudes supplied on a scale (e.g., decibels), which makes sense for the application domain (e.g., (10, 40, 40, 10)). Notice that more-specific levels are associated with a decreased width in frequency response—allowing for the better characterization of nuances.

Just as permutations capture rotations of visual images in the plane, Doppler shifts capture the motion of acoustical contacts towards or away from the observer. A Doppler shift can be confirmed by computing the permutations in an attempt to obtain a match. For example, a centroid of (500 Hz, 1000 Hz, 1,500 Hz, 2,000 Hz), or (500, 1,000, 1,500, 2,000) is perceived to be rapidly approaching if it is received as (1,000, 1,500, 2,000, 2,500). Up or down shifts of one or more displacements can be easily computed and matched. The more specific the level, the greater the sensitivity to Doppler-shifting motion relative to the observer.

Regarding the matching process, consider the set of pictures in a database and a snapshot, where the objective is to compare the objects in the snapshot and try to "match" the objects to pictures in the database. This is looking at the "level of features" which differentiates it from other image matching. The snapshot image has attributes (e.g., semantics) that are quantified, such as square, shiny, etc. Upon fusion of the attributes, then a decision can be made whether the image is a car or person. If not a match, then feedback back to the system can be provided to let the system know how "far away" the attributes are.

In this regard, training can be used for matching by using a qualifying measure of error, for example, 20% wrong versus 40%. Training can be developed using a weighting scheme and adjusting the weights. Using a scoring system, the system can try to learn, which is the best score to match to. For example, ten images are in a database where each image is scored. The best score is designated as the best match, or when there is a threshold where no image matches, there is no match.

Another example to better explain the concept of "fusion" is presented using lightning as the example. The recognition of lightning is often a fusion of an immediate flash-bulb effect (image domain) followed by a delayed cannon-like thunder (audio domain). Fusion requires searching all auditory feedback over an arbitrary interval of k seconds, where $0 \leq k \leq c$ and c may be fuzzy in an attempt to satisfy, $\cup(flash_t, thunder_{t+k})$ →lightning. Simple fusion, such as typified here, may be hardwired or if more complex, processed through a knowledge base (e.g., KASER, Cbfer, etc.).

Also, in recognizing an image, the shape, color, velocity, acceleration, etc. can all play a fundamental role. The union of these vectors is used to best characterize the image. The multiple vectors (at each level), produced by the union, is then the vector signature (see Theorem 2). It then follows from Comment 2.1 that the semantics of the vector signature is that of the union of the semantics of each of multiple vectors. For example, lightning has the same image signature of a flash bulb and thunder presumably has the same auditory signature as a cannon. But, $\cup(flash_t, thunder_{t+k})$ lightning, where $0 \leq k \leq c$ and c may be fuzzy. If any member of the union fails to be matched at level i, the next more-specific level is computed, where it exists.

Images may be normalized by way of permuting their signature vectors until a best-matching vector is found (see Comment 2.2). The permutations seen in FIG. 2 can be given by (1, 2, 4, 6, 5, 4, 4, 5), (2, 4, 6, 5, 4, 4, 5, 1), (4, 6, 5, 4, 4, 5, 1, 2), (6, 5, 4, 4, 5, 1, 2, 4), (5, 4, 4, 5, 1, 2, 4, 6), (4, 4, 5, 1, 2, 4, 6, 5), (4, 5, 1, 2, 4, 6, 5, 4), and (5, 1, 2, 4, 6, 5, 4, 4). Note that a megapixel image can be covered by 1,000 ray traces, for which the permutations are deemed to be tractable. The greater the number of vectors, the more times that the same vector will be saved at each level (e.g., due to differing accelerations), but the vectors are implicitly fuzzified through the use of the level concept, which tends to minimize the number of such savings. That is, the method implicitly and maximally avoids redundancy by only storing a more-specific vector when a more-general one (in union) won't do (as described below). Most significantly, the union of multiple signature vectors can be processed piecewise independently (e.g., parallel processed) and then fused for a combined semantics. Note that if A and B fuse to give C, then they may not give anything but C at said level. However, since consistency need only be maintained intra-level (see Theorem 3a), at another distinct level, A and B may fuse to give D. The nature and number of such signature vectors is necessarily domain-specific (see Comment 2.2).

As described in various embodiments detailed below, at each level the exemplary approach stores the ray vector for each image (or equivalent, or in union) at that level. Then each image (or equivalent) is ascribed one or more syntactic labels having a common semantics. This approach mimics speech in humans. Only one semantics is ascribed to any image (or equivalent) at each level. The levels are visited in order from most-general (for example, level 0) to most-specific (for example, level n), which can serve to speed up the recognition process as well. Images (or equivalent) are only saved to a level of specificity associated with their actual use.

An image (or equivalent) is understood to be saved at the current level if its semantics is distinct from all other images at that level and the new image does not share a common permutation (or equivalent) with an existing image, at that level, lest non-determinism be enabled (see Theorem 3c). Images are understood to include other modalities or unions thereof. Images sharing a common semantics and a common permutation are not allowed due to their redundancy. This is easy to effect by not acquiring such semantics and associated vector. Images sharing a common semantics or not, but without a common permutation are saved.

Images sharing a common permutation, but having distinct semantics are indicative of failure of the number of pixels at the current level to discriminate the images as evidenced by the non-determinism. In this event, both images (or equivalent) are removed from the current level and storage is attempted at the next more-specific level (i.e., using the computed enhanced resolution) until the pair is saved or the most-specific level is attained. Even if the original pair is successfully saved at some level (expunging, as needed, the least-recently used (LRU) member at level n to free space), a check should to be performed at that level for induced non-determinism in up to two pairs. If a new non-determinism is found where the original pairing is now deterministic, then the new non-deterministic pair(s) are removed, stacked, and recursively processed as before. Any deterministic pairs may be saved at the level they were found at. If either member of a non-deterministic pairing is not available for more resolute computing, then it can be expunged and forgotten. If the storage attempt fails at the most-specific level, the most-recent image (or equivalent) can be saved and the LRU member at that level can be expunged if needed to free space (see Theorem 3e).

Figure 3A:
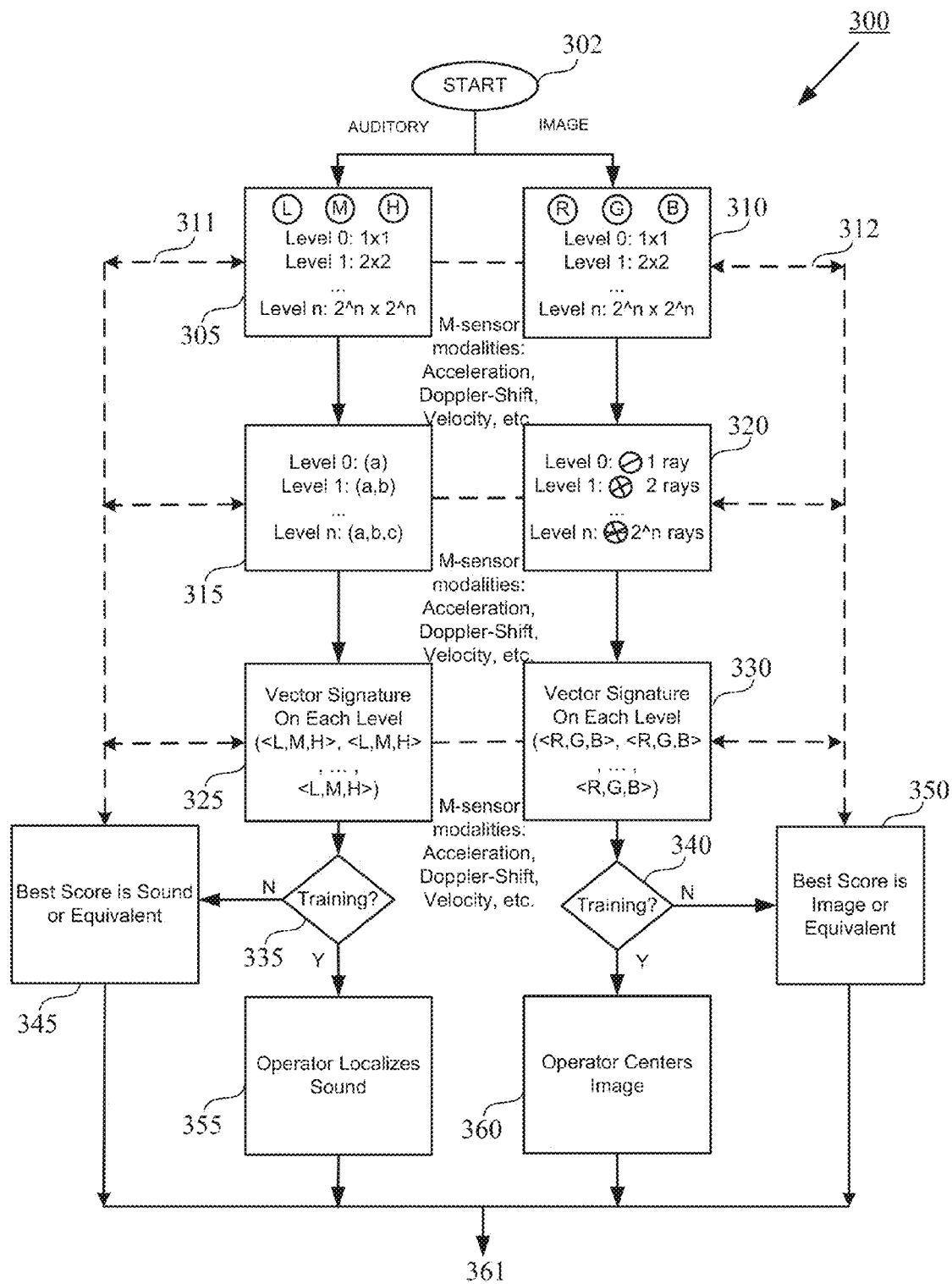
FIGS. 3A-C are process diagrams of an exemplary recognition approach.
Figure 3B:
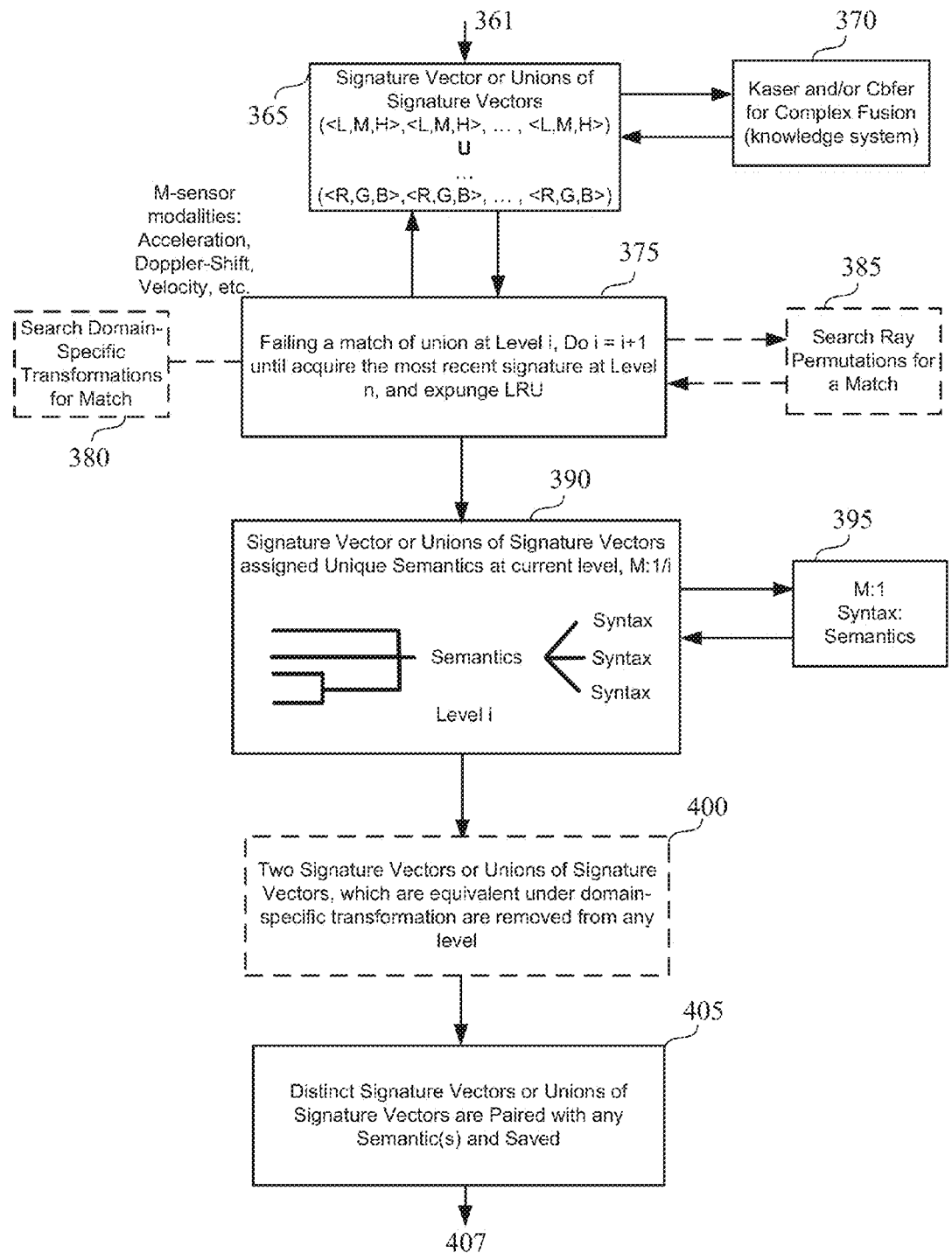
Figure 3C:
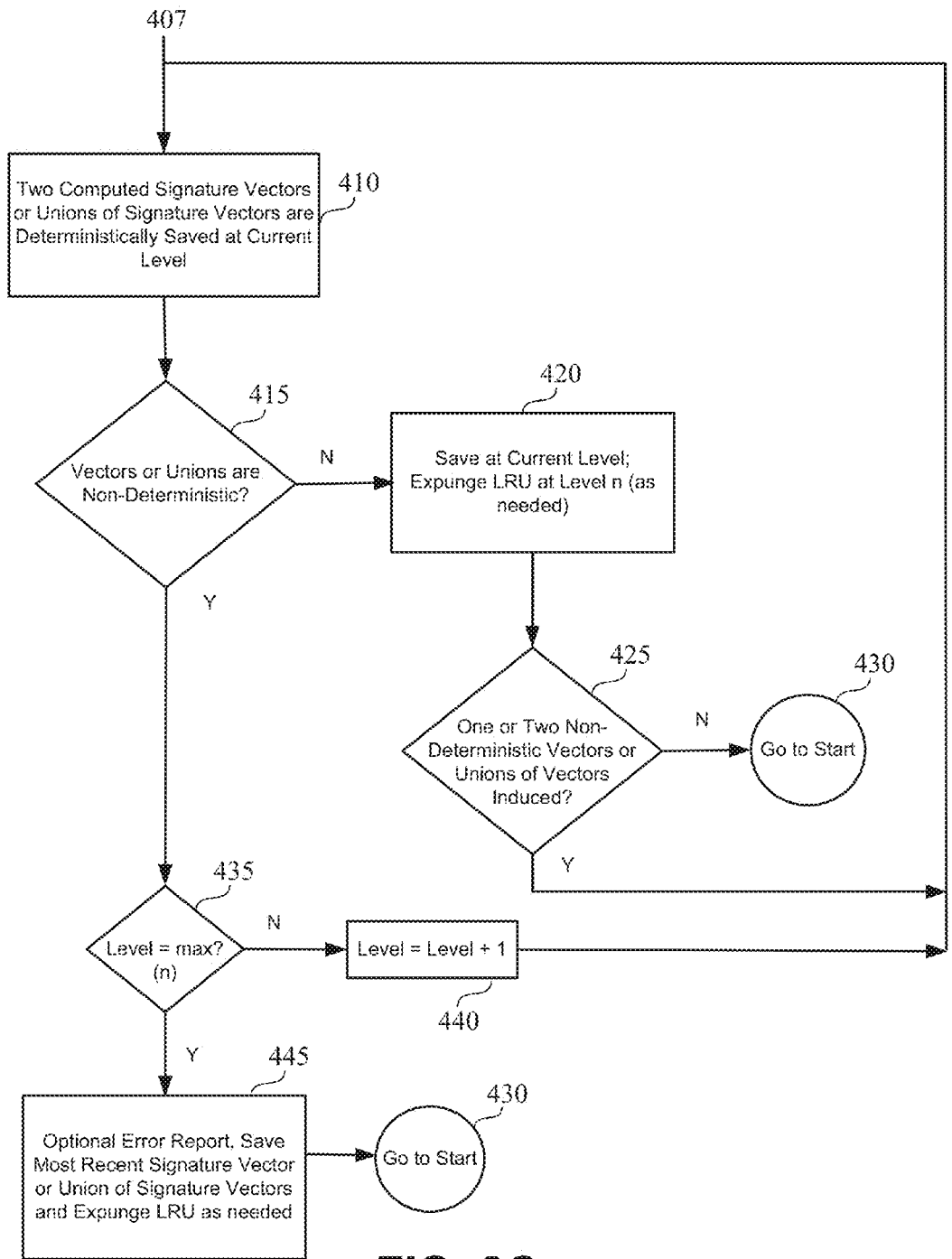

FIGS. 3A-C below present a flowchart of a process 300, exemplifying aspects of the above-described approach for implementation in a smart photo-reconnaissance UAV/UUV, using sound and color image data. It is expressly understood that while the example of FIGS. 3A-C illustrates an input signal from the sound and image domains, other signal domains may be utilized (for example, vibration signatures, statistical data, olfactory/smelling, temperature, etc.) without departing from the spirit and scope of this disclosure.

The exemplary process 300 of FIG. 3A initiates with a start 302, whereas the input signal(s), in this example containing auditory and color image signals are filtered into lower order components. The auditory frequencies can be filtered 305, for example, into its Low (L), Medium (M), and High (H)-pass components and the color image pixels can be filtered 310 into its respective RGB components (presuming, in this example, that RGB is the basis for separating the image components. If a B&W image was utilized, the corresponding B, W components (e.g., gray scale threshold) would be used).

Modules 305 and 310 operate to build hierarchical levels 0-n, with consideration to minimizing the storage requirements. n is a preconfigured limit that may be dependent on the system capabilities. Reference to the mechanism for generating these levels can be found in the description provided above. Once the levels for the respective domains/modalities/sensors are completed, levels for the sets of subsets for the respective features are built as shown in modules 315 and 320. These modules arrange and count "sets" to find the most common elements/sets that can be used match a sound or image.

Information, such as the type of sensor used for the signal capture, acceleration, shifts, velocity, phasing, etc. may be used for additional degrees of freedom. Also, additional degrees of freedom can be obtained from the camera. Specifically, images from the lens zooming in or out (either automatically or via the operator) can be utilized. Further, gyroscopic stabilization and automatic centering of the image in the field of view can be separately maintained, as well as actual altering of the image via navigation of the image capturing device, or altering the type of camera used (e.g., night vision, or starlight).

As an example of motion based discrimination, using visual images only, consider the feature differences between and a rabbit and a squirrel. Because of their similar body shapes, they will require a high level of discrimination. However, if using motion as an additional distinguishing feature, the required level can be lower, since a rabbit and a squirrel move in distinctively different ways.

In module 320, ray tracing is utilized, because it is understood that vehicle vision may inherently not be able to accurately to "center" the image. Ray tracing provides a very convenient mechanism to determine how many times a ray crosses a boundary. So, if the image is not perfectly centered, it will still be robust. In module 315, counts of the respective frequency bands are generated. After the sets of subsets of features are built, the exemplary process 300 proceeds to developing vector signatures 325, 330. The vector signatures add an additional "dimensionality" in that they can capture each level over a time period or "domain" period. In this stage, modalities such as accelerations, shift, velocity, etc., are understood to be easier to resolve. Information from the various modules can be forwarded for feedback or for expansions along domain-specific paths as indicated by the dotted lines 311.

Next, the exemplary process 300 determines if it is in a training mode 335, 340 or not. If it is not in a training mode (N), then the vector signature 325 of the input sound is compared against a database of sounds 345 to determine if there is a match. The sound in the database having the highest matching score is determined to be a match or equivalent to the input sound. Similarly, for the image data, the vector signature 330 of the input image is compared against a database of images 350 to determine if there is a match. The "best scoring" image in the database is used as the match or equivalent to the input image. By resolving the input signal into elementary levels/signature vectors, the data storage space for representation of an object in the vehicle can be significantly reduced. Similarly, the master database for comparison can be significantly reduced.

If it is determined that a training session (Y) is in progress, then the exemplary process 300 proceeds to present the input sound/image matches to the operator for qualification and feedback. The operator can agree with the best scoring results or can override it and select the correct sound/image from the databases for matching. Additionally, the operator's decision operations (adjustments, commands, etc.) for determining the correct match or controlling the vehicle can be used for learning how to approach certain input data for matching criteria. An example may be the operator may shift the image (to center it) or narrow to a particular range of frequencies, turn the vehicle to an aspect of the image, etc. These actions can be processed by the exemplary system for training the exemplary system to effect similar actions when encountering another scenario having similar characteristics. Upon operator action, the exemplary process 300 proceeds to FIG. 3B as indicated by 361.

FIG. 3B is an illustration of the exemplary process 300 continuing from 361. The exemplary process 300, using the individually obtained signature vectors "fuses" 365 the signature vectors from the different domains (signified by the union operator "U"). The signature vectors in either individual form or in fused form are processed by a supporting module 370 for semantic generation. For example, a Knowledge Amplification by Structured Expert Randomization (KASER) or Semantic Randomization (Cbfer) approach can be used for complex fusion. This supporting module 370 can be facilitated by a natural language tool, if so desired, that returns to the exemplary process 300 a semantic describing the object. It is noted that fusion based matching is occurring in the above steps.

Next, if it is determined that no match is found for a union/fusion at a given level "i", then the next upper level 375 is sought for matching. For purposes of reducing memory and storage requirements, an optional procedure of expunging the least-recently used LRU member at the unmatched levels can be performed. Similarly, permutations of the features 385 can be optionally evaluated for matches. For example, a left side facial image may be the object under examination and only the right side facial images may be available in the matching database (not shown). Permuting the image under observation to a different orientation would indicate that the observed image is a mirror image of a matching database image.

On the domain-side, domain-specific transformations 380 may be optionally utilized for determining redundant matches. For example a translation or rotation of the database image would provide the same or nearly same result afforded by module 385. These domain-specific transformations can also be more diverse in their manipulations than what is performed by module 385 and are understood in the art to be easily implemented using, for example, matrix transformations. Domain-specific transformations provide an effective method of generating hundreds, if not thousands, of images (or other domain) from an initial image (or other domain), thereby reducing memory requirements.

Similar to the processes laid out in FIG. 3A, optional information, such as the type of sensor used for the signal capture, acceleration, shifts, velocity, phasing, etc. may be used as differentiation and/or matching attributes along any of the applicable modules.

After step 375 is completed, unique semantics are assigned 390 to the signature vectors or the union of signature vectors. Each level will have a union of signature vectors and an attempt will be made to recognize the object at the least memory intensive (i.e., lowest possible) level. Module 395 provides the syntax for semantic organization across the different levels.

Next, optional memory saving module 400 is used to seek for signature vectors or unions thereof that are equivalent under domain-specific transformation. Transformation-equivalent vectors are removed as a mechanism for saving memory requirements.

Next, distinct vectors or unions thereof are matched with semantics and saved 405. Upon semantic matching, the exemplary process 300 proceeds to FIG. 3C as indicated by 407. It should be noted that the above fusions can be formed across different levels of each domain or modality. For example, a fusion (and commensurate recognition/matching) may occur for a level 0 sound signal with a level 4 image signal and a level 10 scent signal. Therefore, conformity with a given level across all the domains/modalities for matching is not necessary.

FIG. 3C is an illustration of the exemplary process 300 continuing from 407, where further error checking is performed. Module 410 assures that the computed signature vectors or unions thereof are deterministically saved at their current level. That is, matched signature vector will always result in the same semantic. In other words, a signature vector (or union thereof) having been identified as the "semantic→tree" should at every instance represent a tree. To do otherwise, for example, in one instance be identified as a horse, would introduce ambiguities. Module 415 inquires as to whether the signature vectors (or unions) are non-deterministic. If they are non-deterministic (N) then there are no ambiguities and it is saved at the current level 420 and, as desired, the least recently used signature vector can be expunged. From module 420, a check is performed 425 to see if the exemplary process 300 created a signature vector (or union thereof) that is in conflict with a prior existing signature vector (or union thereof). If no conflict (N) is found, then the exemplary process returns 430 to the start 302 of the exemplary process. If there is a conflict (Y), then the exemplary process 300 returns to module 410.

Returning to module 415, if the signature vectors (or unions thereof) are non-deterministic, then an ambiguity has occurred and the exemplary process 300 checks to see if the maximum level 435 has been used. If the maximum level has not been used (N), the next higher level 440 is obtained and the exemplary process 300 returns to module 410 for re-evaluation using the higher level signature vectors (or unions thereof).

If the maximum level has been used (Y), then a default action 445 of saving the most recent signature vector (or union thereof) as the "best" representation of the object is performed and an optional LRU purge is performed. Optionally, an error notification may be generated. From here, the exemplary process 300 returns 430 to the start 302.

Figure 4:
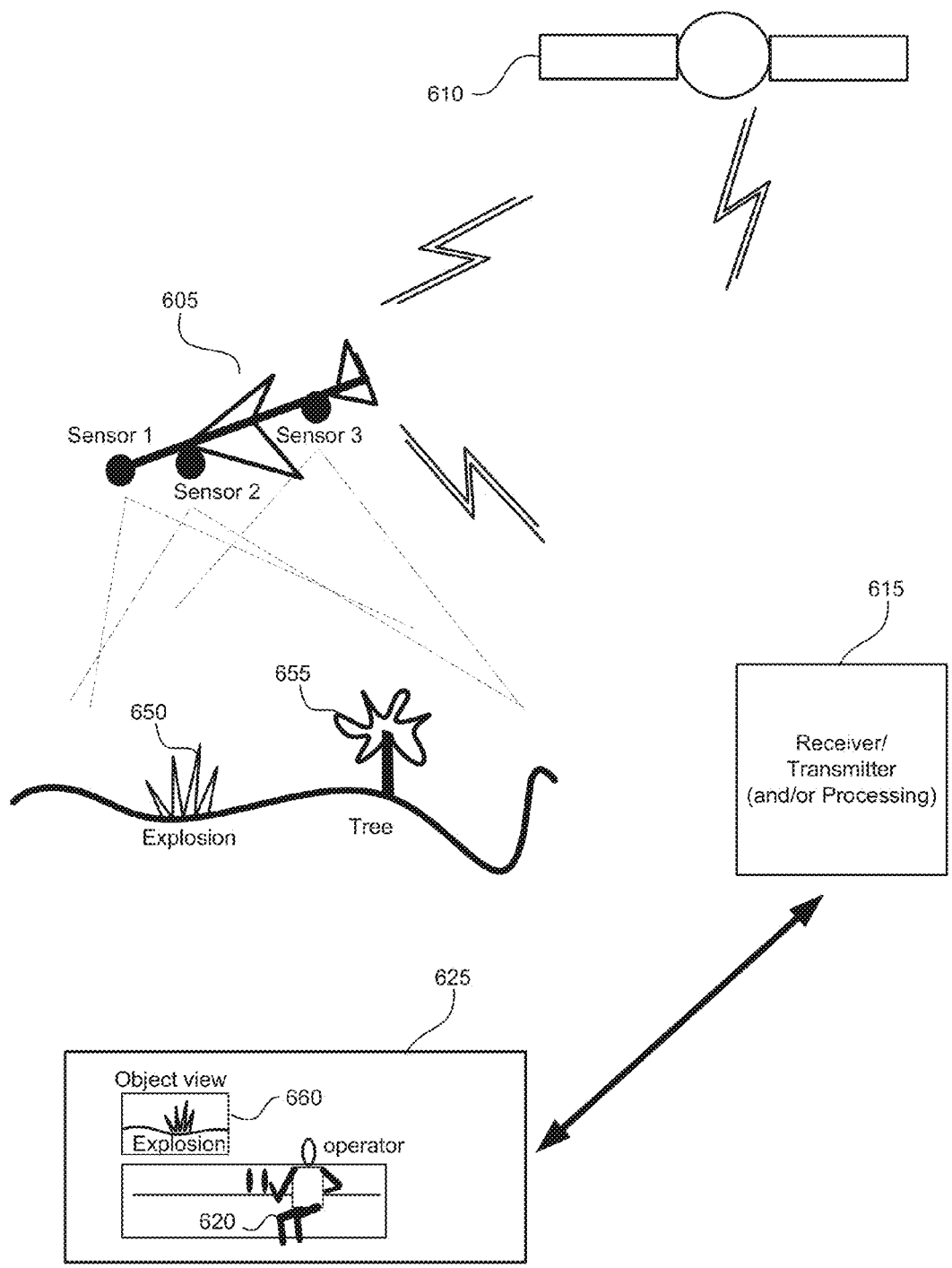
FIG. 4 is an illustration of an exemplary implementation.

FIG. 4 is an illustration of one of several modes of operation utilizing the exemplary methods and systems described above, specifically in the framework of a UAV reconnaissance mission. UAV 605 is shown with possible several multimodal sensors (1-3) viewing a terrain with a terrestrial explosion 650 in progress and a tree 655 in proximity to each other. The UAV 605 is in communication with satellite 610 and (depending on link capabilities) to receiving/transmitting station 615. The signals from the UAV 05 are forwarded to UAV control center 625 housing the object view 660 and operator 620, controlling the UAV 605. The control center 625 and/or the receiving/transmitting station 615 may house the computer hardware executing the exemplary processes. Of course, given the distributed nature of processing, a remote server or network or servers (not shown) may execute all or some of the exemplary processes.

Presuming, for arguments sake, that from the perspective of the UAV 605 the visual scatter pattern of the explosion 650 is similar to the visual pattern of the top of the tree 655. In related art systems, the UAV 605 may not be able to distinguish the explosion 650 from the tree 655 solely relying on an image of the objects. Or if so, it requires the significant application of resources to distinguish the objects in its field of view. Utilizing the exemplary systems and methods described herein, secondary sensor 2 or 3 (having, in this example, audible detection capabilities) will hear the sound of an explosion and fusing that information with the image of the explosion's scatter pattern will arrive at a very high probability conclusion that the object 650 is an explosion. That is, the semantic term or relation "explosion" (or some equivalent) will be assigned to the signature vectors (or union), which represents the UAV's observation.

Operator 620 (or a proxy thereto) can correct the "learning" of the exemplary system by evaluating conclusions from the exemplary system and agreeing with or disagreeing with the result. Further, the operator 620 can accelerate the learning by narrowing the UAV's field of view to the explosion 650, the operator recognizing subtleties in the view or sound that the UAV 605 is not able to recognize. The operator's action is recognized by the exemplary system as providing another "data point" for resolving the UAV's observation. Utilizing the operator's action, the exemplary system can automatically replicate the operator's action in the next occurrence of a similar event. Thus, not only can the exemplary system utilize learning from the operator's action for increased recognition capabilities, it can learn what is considered "important" to the operation of the UAV 605. That is, the explosion object 650 that has a loud accompanying sound is important to the objectives of the mission as seen by the operator 620, as compared to the similar shaped (tree) object 655 that does not have a large accompanying sound.

It should be evident that by combining different modalities (sensor capabilities) and utilizing feedback from the operator 620, in accordance with the exemplary approaches described herein, a significant performance increase can be achieved in the field of machine recognition while reducing memory and processing requirements. As matching information is developed for each scenario, the exemplary system can develop the tools for automatically controlling the UAV 605 when certain "interesting" objects are recognized by the exemplary system, thereby reducing the level of effort for the operator 620, and improving mission efficiencies.

In view of the above, it is understood that the exemplary system can be applied to multiple different platforms and that "training" of the system can performed in an off-line procedure, using recorded information to build the appropriate matching databases. Therefore, based on the above descriptions, it is understood that many changes and modifications may be contemplated without departing from the spirit and scope of this disclosure. For example, various error-checking aspects of the exemplary system may be considered optional to the "building" of the fusion vectors.

Accordingly, it will be understood that many additional changes in the details, materials, steps and arrangement of parts, which have been herein described and illustrated to explain the nature of the disclosure, may be made by those skilled in the art within the principal and scope of the disclosure as expressed in the appended claims.

What is claimed is:

1. A computerized method for machine recognition of objects or events from a remotely controlled, unmanned vehicle, comprising:
   electronically receiving a signal from a plurality of sensors deployed on the vehicle;
   determining signal-specific components for partitioning each signal;
   building sets of independent levels for each received signal representing hierarchal information from the signals, each set containing levels spanning from a lowest information level (i=0), where i is an integer, to a highest information level (i=n), where n is a maximum integer;
   evaluating each level (i) within its set with its associated signal-specific components;
   building sets of vector signatures associating each level (i) with its evaluated associated signal-specific components;
   correcting, via a remote human operator of the vehicle, an accuracy of the vector signatures;
   combining the sets of vector signatures from each signal to form fused signature vectors;
   mapping natural language semantics to match the fused signature vectors, beginning at lower levels and increasing until a match is found;
   assigning unique matched semantics to each level(i);
   pairing syntaxes with the unique semantics and saving the associated fused signature vectors; and
   eliminating fused signature vectors that result in non-deterministic matches,
       wherein resulting sets of fused signature vectors and their syntaxed unique semantics define a transformation of information from the signals into machine generated descriptions of objects or events; and
   wherein the building sets of independent levels is performed according to:
      level (i=n) if it contains $2^n \times 2^n$ bits of information; and
      signal information may be strictly converted from level n to level n−1 according to:

$$\bigcup_{i=0}^{2^{n-1}-1} \bigcup_{j=0}^{2^{n-1}-1} a_{i,j} = \begin{pmatrix} 1, & \delta_{i,j} > \text{threshold} \\ 0, & \text{otherwise;} \end{pmatrix}$$

where, $$\delta_{i,j} = \frac{a_{2i+1,2j+1} + a_{2i+2,2j+1} + a_{2i+1,2j+2} + a_{2i+2,2j+2}}{4},$$

where variable "a" is a subscripted pixel.

* * * * *